United States Patent

[11] 3,620,836

| [72] | Inventor | Charles R. Morelock |
| | | Ballston Spa, N.Y. |
| [21] | Appl. No. | 813,691 |
| [22] | Filed | Apr. 4, 1969 |
| [45] | Patented | Nov. 16, 1971 |
| [73] | Assignee | General Electric Company |

[54] BOROCARBON-COATED FILAMENTS
2 Claims, No Drawings

[52] U.S. Cl. .................................................. 117/216,
117/46 CB, 117/106 R, 117/217
[51] Int. Cl. ........................................................ C23c 11/08
[50] Field of Search ............................................ 117/46,
106, 215, 216, 217

[56] References Cited
UNITED STATES PATENTS
| 1,019,391 | 3/1912 | Weintraub | 117/DIG. 10 |
| 2,764,510 | 9/1956 | Ziegler | 117/216 |
| 2,853,969 | 9/1958 | Drewett | 117/46 X |
| 3,164,487 | 1/1965 | Carley-Macauly | 117/46 |

Primary Examiner—Ralph S. Kendall
Attorneys—Richard R. Brainard, Paul A. Frank, Charles T. Watts, Frank L. Neuhauser, Oscar B. Waddell and Joseph B. Forman ABSTRACT: The production of borocarbon-coated filaments by the pyrolysis of a mixture of boron trichloride and a hydrocarbon gas or vapor is disclosed. The filament is electrically conductive or has an electrically conductive coating and is resistively heated to about 1,000° to 1,200° C. in the presence of the mixture. The hydrocarbon is one which will not react with the boron trichloride except at the heated substrate. A boron coating is applied to the borocarbon-coated filament by pyrolysis of a mixture of boron trichloride and hydrogen.

BOROCARBON-COATED FILAMENTS

CROSS-REFERENCE

Cross-reference is hereby made to the copending application of the present inventor, Ser. No. 714,853, filed Mar. 21, 1968, assigned to the assignee of the present invention, and entitled "Coated Filaments," the disclosure of which is incorporated by reference herein.

BACKGROUND OF THE INVENTION

As previously described in greater detail in the previously referenced copending patent application Ser. No. 714,853, a borocarbon coating may be deposited upon the electrically heated surface of a pyrolytic carbon coated fused silica or quartz fiber as it is passed through a liquid composed of a thermally decomposable boron compound such as boron trichloride dissolved in a nonpolar organic solvent such as benzene. The surface of the filament produces an envelope of solvent vapor and boron trichloride gas which are pyrolytically decomposed and carbon and boron are simultaneously deposited on the filament as a borocarbon coating which has an intrinsically higher electrical conductivity than carbon, is mechanically stronger than carbon and is at least as chemically inert as carbon. These filaments may then be further coated with, for example, elemental boron, silicon carbide, pyrolytic graphite and other known materials for the reinforcement of matrices such as polymeric organic materials or of metals, or, these filaments may be so employed without applying further coatings.

In the production of the borocarbon coating of the previously referenced disclosure, a plurality of vertically spaced pools of mercury as electrodes were employed for heating the filament, and, as disclosed, the liquid solution of the reactants acted as a coolant to prevent the mercury pools from overheating. However, utilizing such a liquid as the reactant is less efficient than when the reactant is supplied in the form of a gas or vapor since part of the electric energy is utilized in vaporizing the liquid to form the envelope of reactant gas.

It would therefore be desirable to produce such borocarbon coatings from a reactant gas rather than from a liquid reactant and such is a principal object of this invention.

More specifically and by way of a working example of the invention, a pyrolytic carbon coated silica filament about 1 mil in diameter was resistively heated to a temperature of about 1,000° to 1,200° C. for about 10 seconds in a reaction chamber containing a mixture of boron trichloride gas and a hydrocarbon vapor. The mixture was achieved by passing boron trichloride gas over benzene at about 30° C. and then into the reaction chamber. A two micron thick coating of borocarbon was formed and the initial electrical resistance of the carbon coated filament was thus reduced from about $1.5 \times 10^6$ ohms per inch to $2 \times 10^3$ ohms per inch. This filament was then used to form 4 mil diameter boron coated filament by the pyrolysis of boron trichloride in the presence of hydrogen.

The process may also be carried out substituting toluene vapor for benzene, or mixtures of these hydrocarbons may be employed. Further, the boron trichloride may be bubbled through the liquid hydrocarbons.

It is believed that any hydrocarbon gas or vapor may be employed as long as it does not react with the boron trichloride except at the heated surface of the filament. For example, acetylene is unsuitable because it spontaneously reacts with boron trichloride at room temperature to produce a solid product. It is believed that it is necessary that the hydrocarbon be thermally decomposed to yield elemental carbon and hydrogen which reduces the boron trichloride to elemental boron which forms the borocarbon deposit accompanied by the formation of hydrogen chloride gas. While the production of borocarbon coatings on a carbon coated fused silica filament has been specifically disclosed, other electrically conductive filaments may also be used.

What I claim and desire to secure by Letters Patent of the United States is:

1. A process for the pyrolytic deposition of boron comprising the steps of forming a mixture of boron trichloride gas and a gaseous hydrocarbon which is chemically inert with respect to boron trichloride at temperatures below which it thermally decomposes, contacting a pyrolytic carbon-coated silica substrate with said mixture, resistively heating said substrate to a temperature above the thermal decomposition temperature of said hydrocarbon and thereby causing elemental boron and carbon to deposit simultaneously on said substrate as a borocarbon coating, contacting the resulting borocarbon-coated substrate with a mixture of boron trichloride and hydrogen, and resistively heating the said substrate to 1,000° to 1,200° C. and thereby causing boron to deposit on the said borocarbon-coated substrate.

2. The process of claim 1 in which the substrate is a one-mil carbon-coated silica filament having electrical resistance of about $1.5 \times 10^6$ ohms per inch, and in which resistive heating of the substrate in contact with the boron trichloride gas and gaseous hydrocarbon is continued until the resulting borocarbon coating is two mils thick and the electrical resistance of the filament has thereby been reduced to $2 \times 10^3$ ohms per inch, and in which resistive heating of the borocarbon-coated substrate in contact with the boron trichloride—hydrogen mixture is continued until the resulting boron coating is four mils thick.